United States Patent
Seagle et al.

(10) Patent No.: US 10,902,873 B1
(45) Date of Patent: Jan. 26, 2021

(54) APPARATUS WITH MULTI-CHANNEL TAPE HEAD MODULE HAVING CONTROLLABLE EXPANSION ELEMENTS

(71) Applicant: International Business Machines Corporation, Armonk, NY (US)

(72) Inventors: David Seagle, Morgan Hill, CA (US); Robert G. Biskeborn, Hollister, CA (US); Hugo E. Rothuizen, Oberrieden (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/578,324

(22) Filed: Sep. 21, 2019

(51) Int. Cl.
*G11B 5/584* (2006.01)
*G11B 5/592* (2006.01)
*G11B 5/588* (2006.01)

(52) U.S. Cl.
CPC ............ *G11B 5/5926* (2013.01); *G11B 5/584* (2013.01); *G11B 5/588* (2013.01); *G11B 5/592* (2013.01); *G11B 5/5921* (2013.01)

(58) Field of Classification Search
None
See application file for complete search history.

(56) References Cited

U.S. PATENT DOCUMENTS

| | | | | |
|---|---|---|---|---|
| 5,982,711 A | * | 11/1999 | Knowles | G11B 5/4893 360/53 |
| 6,108,159 A | | 8/2000 | Nute et al. | |
| 6,243,225 B1 | * | 6/2001 | Wyman | G11B 5/584 360/77.12 |
| 6,611,398 B1 | | 8/2003 | Rumpler et al. | |
| 6,757,128 B2 | | 6/2004 | Yip | |
| 6,999,268 B2 | | 2/2006 | Hoerger | |
| 7,649,707 B2 | | 1/2010 | Saliba | |
| 9,373,346 B1 | * | 6/2016 | Bui | G11B 5/584 |
| 10,460,757 B1 | * | 10/2019 | Judd | G11B 15/18 |
| 10,580,438 B1 | * | 3/2020 | Biskeborn | G11B 5/588 |
| 10,614,846 B1 | * | 4/2020 | Harper | G11B 5/581 |
| 2004/0047067 A1 | * | 3/2004 | Yip | G11B 5/584 360/77.12 |
| 2006/0171060 A1 | * | 8/2006 | Anderson | G11B 5/584 360/77.12 |

(Continued)

FOREIGN PATENT DOCUMENTS

| | | |
|---|---|---|
| EP | 1489600 A1 | 12/2004 |
| JP | 2004022100 A * | 1/2004 |

OTHER PUBLICATIONS

Computer translation of JP-2004022100, Jan. 2004.*

(Continued)

*Primary Examiner* — Tan X Dinh
(74) *Attorney, Agent, or Firm* — Zilka-Kotab, P.C.

(57) ABSTRACT

An apparatus, according to one embodiment, includes a module having an array of transducers, and at least two expansion elements positioned proximate the array of transducers. The expansion elements are arranged side by side along a line extending parallel to a longitudinal axis of the array of transducers, wherein the array of transducers includes at least three servo readers. A controller is electrically coupled to the expansion elements, and is configured to individually control an extent of expansion of each expansion element based on feedback from the servo readers.

20 Claims, 14 Drawing Sheets

(56) References Cited

U.S. PATENT DOCUMENTS

| | | | | |
|---|---|---|---|---|
| 2006/0186756 A1* | 8/2006 | Langlois | ................ | G11B 5/584 |
| | | | | 310/317 |
| 2007/0131811 A1* | 6/2007 | Biskeborn | .............. | G11B 15/60 |
| | | | | 242/334.6 |
| 2010/0079907 A1* | 4/2010 | Anderson | ................ | G11B 5/78 |
| | | | | 360/84 |
| 2012/0188665 A1* | 7/2012 | Biskeborn | .............. | G11B 5/584 |
| | | | | 360/77.12 |
| 2016/0125909 A1* | 5/2016 | Fasen | .................... | G11B 15/54 |
| | | | | 360/73.08 |
| 2019/0333536 A1* | 10/2019 | Olson | .................. | G11B 21/103 |
| 2020/0126595 A1* | 4/2020 | Biskeborn | .......... | G11B 5/00813 |
| 2020/0126596 A1* | 4/2020 | Biskeborn | .......... | G11B 15/1883 |

OTHER PUBLICATIONS

Raeymaekers et al., "Design of a dual stage actuator tape head with high-bandwidth track following capability", Springer Jan. 2009, p. 5, http://citeseerx.ist.psu.edu/viewdoc/download?doi=10.1.1.591.6848&rep=rep1&type=pdf.

* cited by examiner

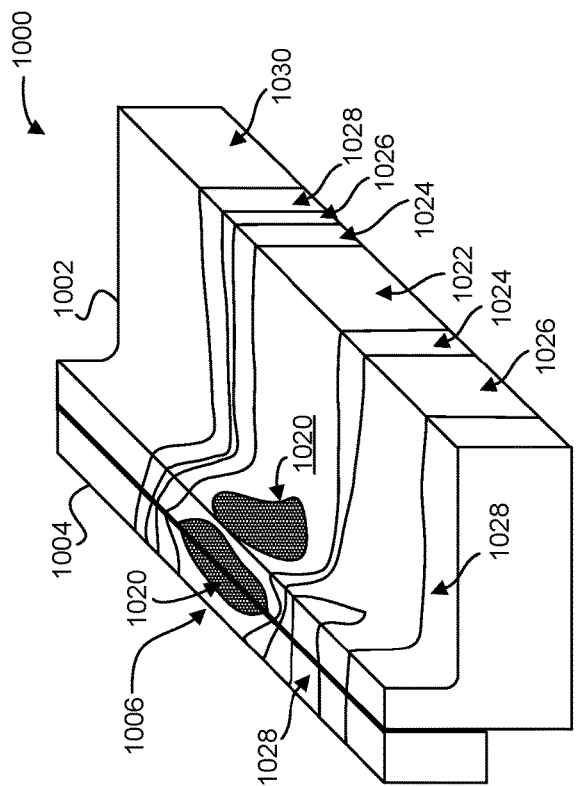
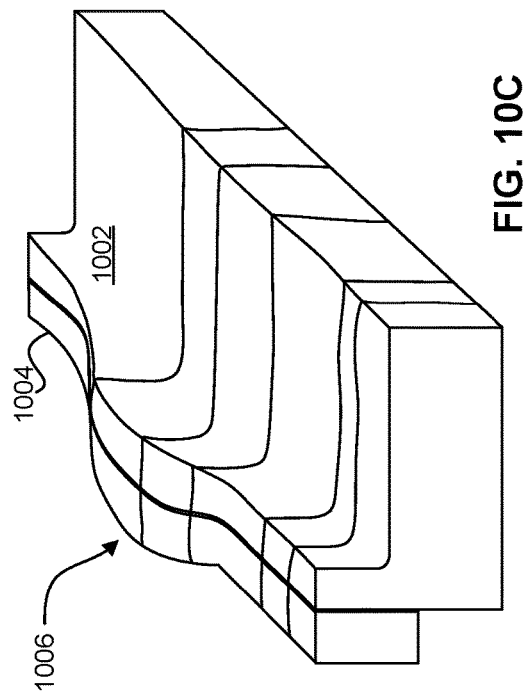
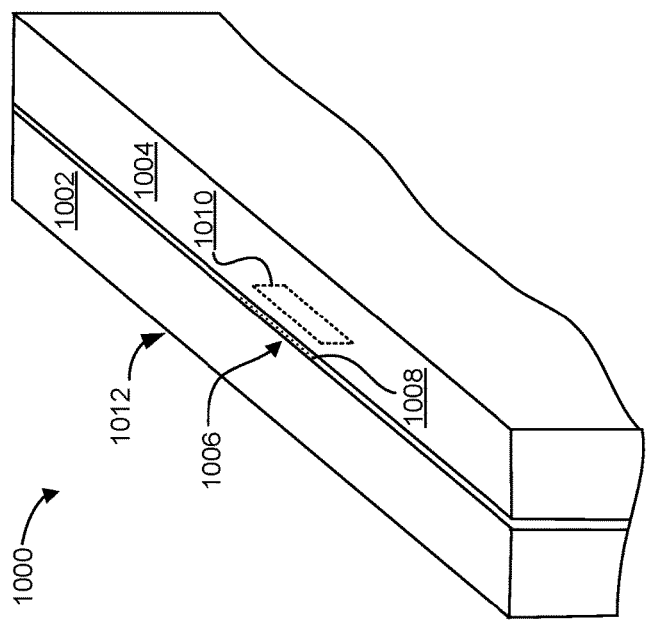
FIG. 10B
FIG. 10C
FIG. 10A

US 10,902,873 B1

APPARATUS WITH MULTI-CHANNEL TAPE HEAD MODULE HAVING CONTROLLABLE EXPANSION ELEMENTS

BACKGROUND

The present invention relates to data storage systems, and more particularly, this invention relates to a multichannel tape head module having settable transducer pitch in a manner that reduces nonlinear residuals in the expansion of a transducer array.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape and decreasing the thickness of the magnetic tape medium. However, the development of small footprint, higher performance tape drive systems has created various problems in the design of a tape head assembly for use in such systems.

SUMMARY

An apparatus, according to one embodiment, includes a module having an array of transducers, and at least two expansion elements positioned proximate the array of transducers. The expansion elements are arranged side by side along a line extending parallel to a longitudinal axis of the array of transducers, wherein the array of transducers includes at least three servo readers. A controller is electrically coupled to the expansion elements, and is configured to individually control an extent of expansion of each expansion element based on feedback from the servo readers.

A method, according to one embodiment, includes receiving servo information from at least three servo readers in an array of transducers on a module as a magnetic recording tape moves over the servo readers, the servo readers defining sections of the array of transducers, each section having at least one data transducer. Using the servo information, a determination is made as to whether a pitch of adjacent data transducers in each section of the array of transducers is different than an estimated pitch of data tracks on the magnetic recording tape to be operated on by the data transducers. For each section of the array of transducers individually, in response to determining that the pitch of adjacent data transducers in the section is different than the estimated pitch of data tracks on the magnetic recording tape, at least one expansion element positioned proximate to the section is caused to change an extent of expansion thereof for adjusting the pitch of the transducers in the section.

A computer program product, according to one embodiment, includes a computer readable storage medium having program instructions embodied therewith, the program instructions executable by a controller to cause the controller to perform the foregoing method.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTIONS OF THE DRAWINGS

FIG. 10A is a schematic drawing of a partial view of a module having a single heating element.

FIG. 10B is temperature map of the module of FIG. 10A, according to modeling studies.

FIG. 10C is a map of thermal expansion of the module of FIG. 10A, according to modeling studies.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes a module having an array of transducers, and at least two expansion elements positioned proximate the array of transducers. The expansion elements are arranged side by side along a line extending parallel to a longitudinal axis of the array of transducers, wherein the array of transducers includes at least three servo readers. A controller is electrically coupled to the expansion elements, and is configured to individually control an extent of expansion of each expansion element based on feedback from the servo readers.

In another general embodiment, a method includes receiving servo information from at least three servo readers in an array of transducers on a module as a magnetic recording tape moves over the servo readers, the servo readers defining sections of the array of transducers, each section having at least one data transducer. Using the servo information, a determination is made as to whether a pitch of adjacent data transducers in each section of the array of transducers is different than an estimated pitch of data tracks on the magnetic recording tape to be operated on by the data transducers. For each section of the array of transducers individually, in response to determining that the pitch of adjacent data transducers in the section is different than the estimated pitch of data tracks on the magnetic recording tape, at least one expansion element positioned proximate to the section is caused to change an extent of expansion thereof for adjusting the pitch of the transducers in the section.

In yet another general embodiment, a computer program product includes a computer readable storage medium having program instructions embodied therewith, the program instructions executable by a controller to cause the controller to perform the foregoing method.

Figure 1A:
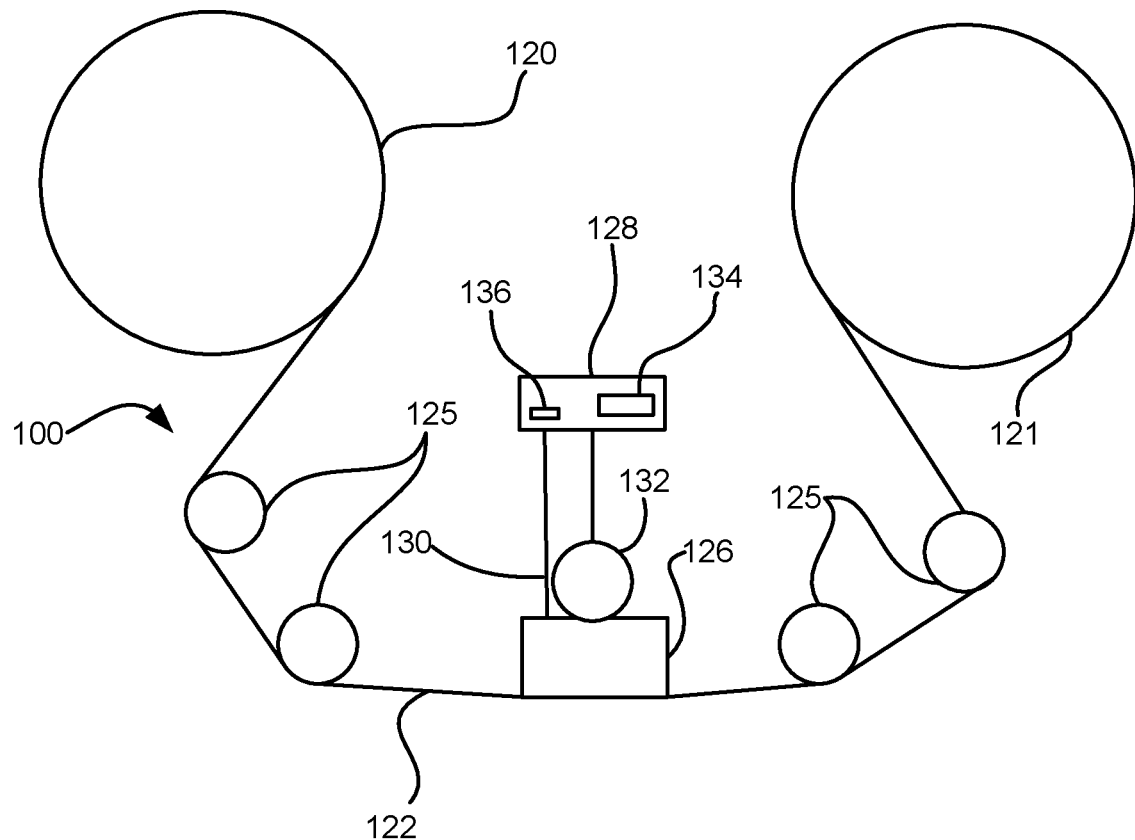
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
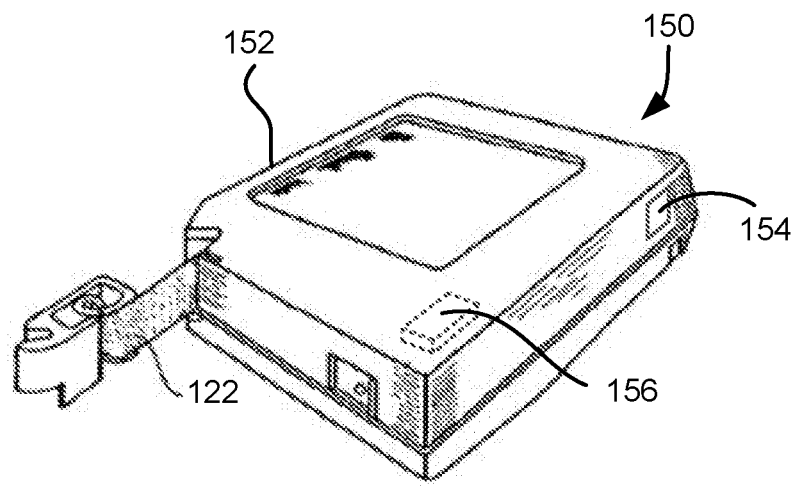
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
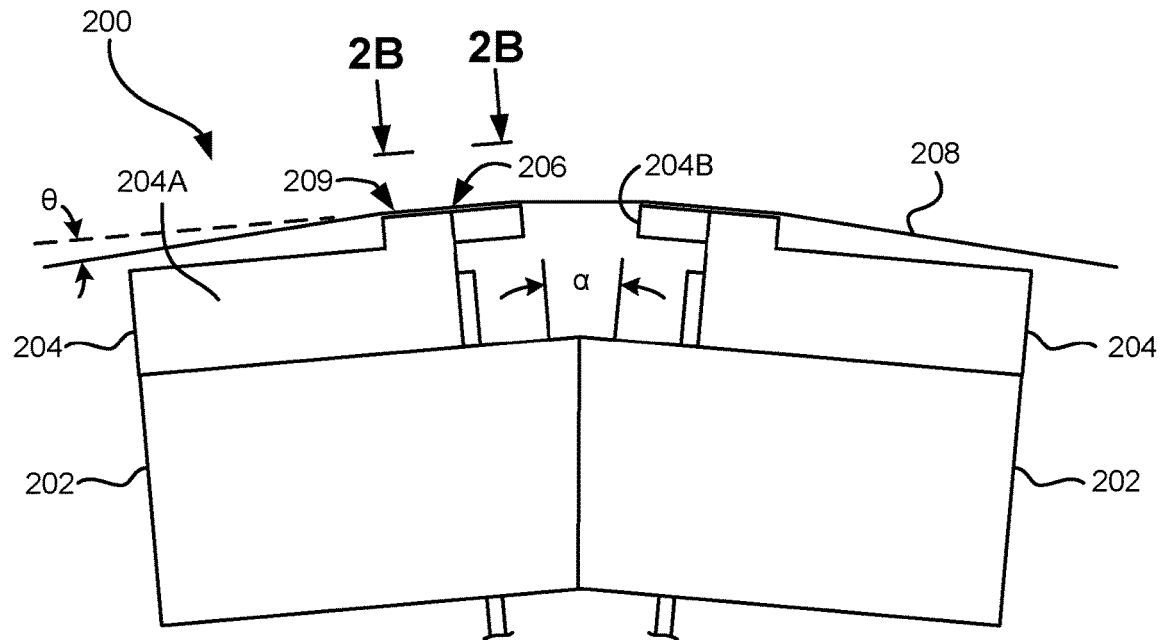
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
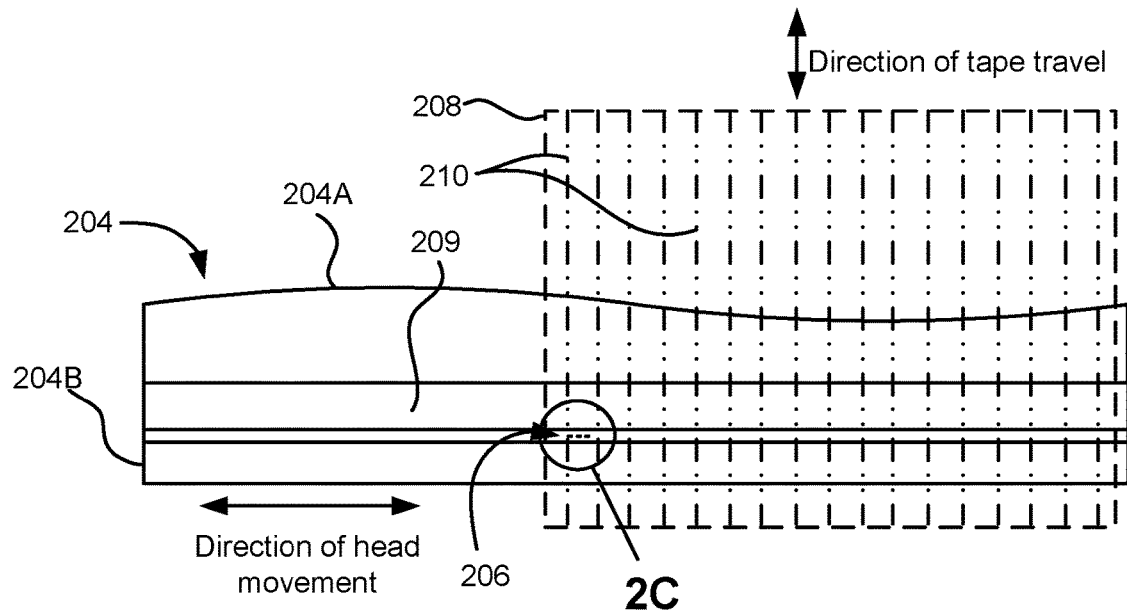
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
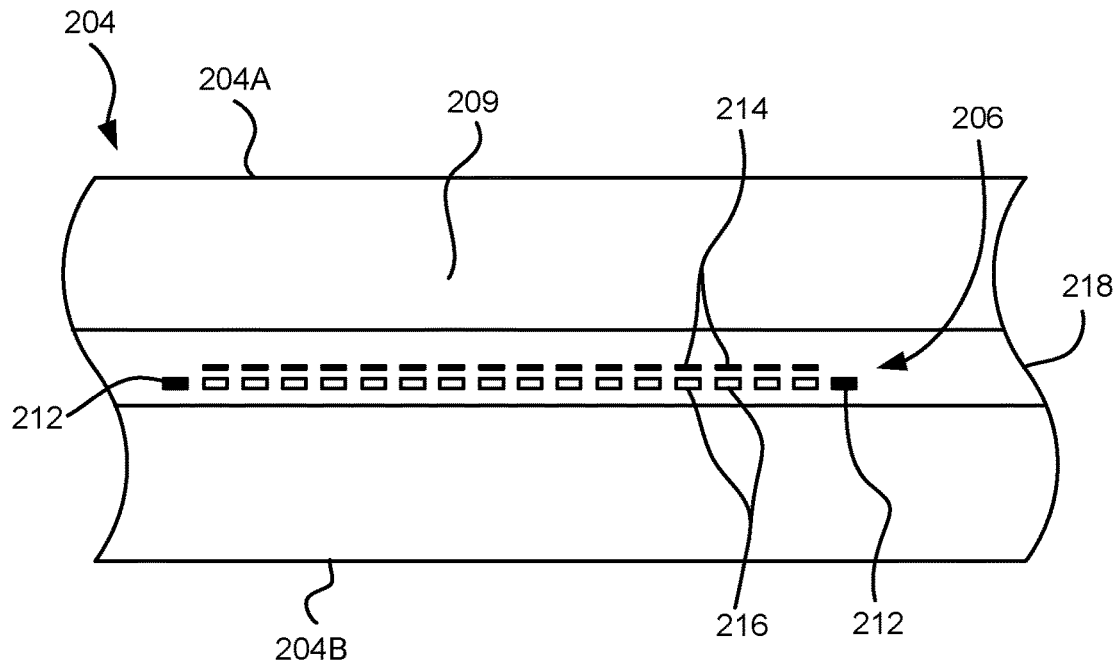
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
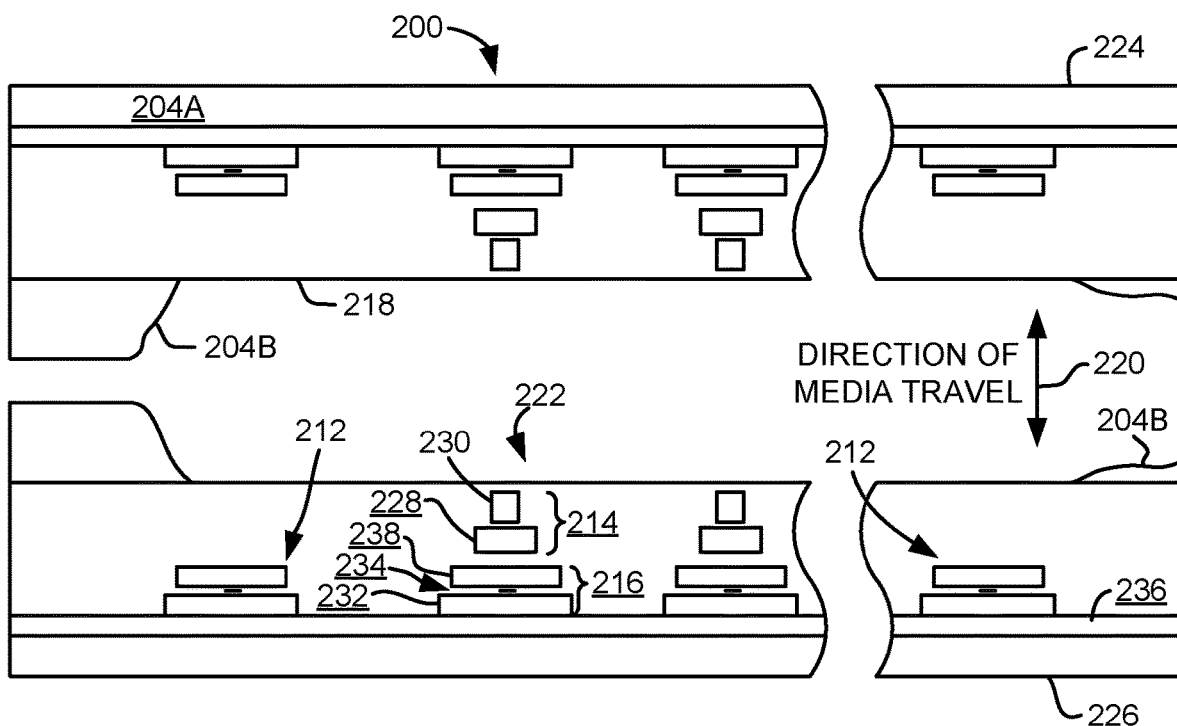
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked magnetoresistive (MR) head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (-), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 3:
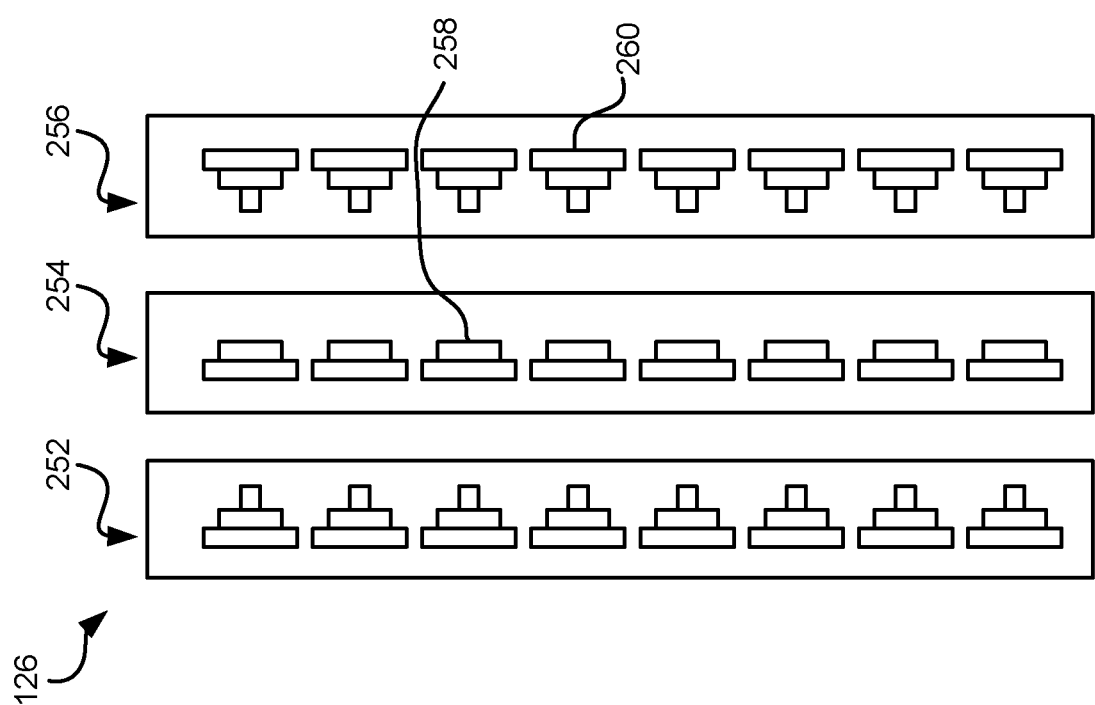
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration.

Figure 4:
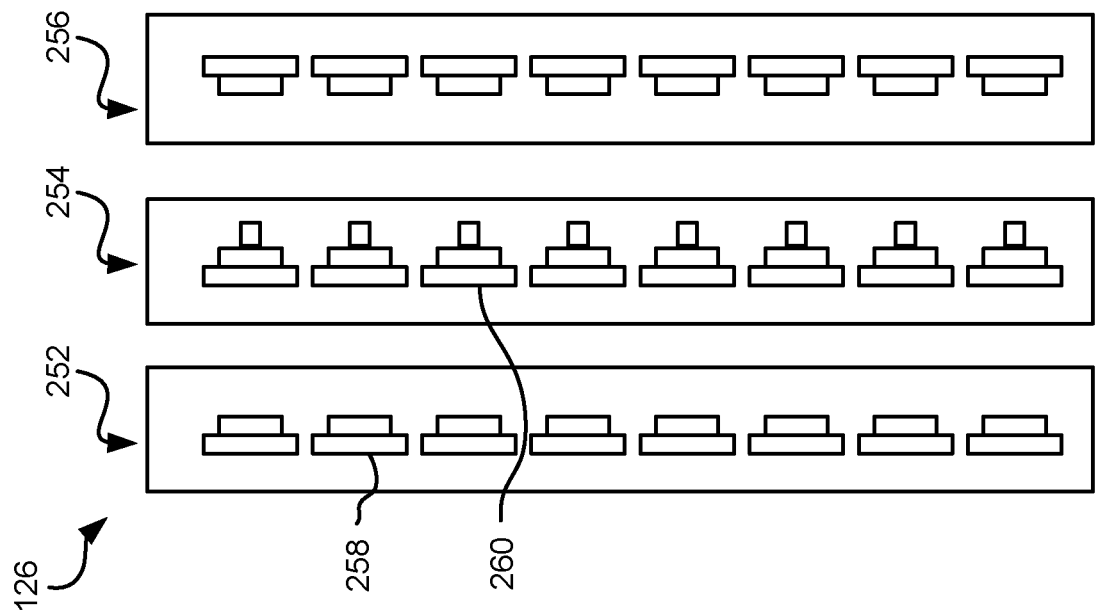
FIG. 4 is a partial tape bearing surface view of a magnetic head having a read-write-read configuration.

Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
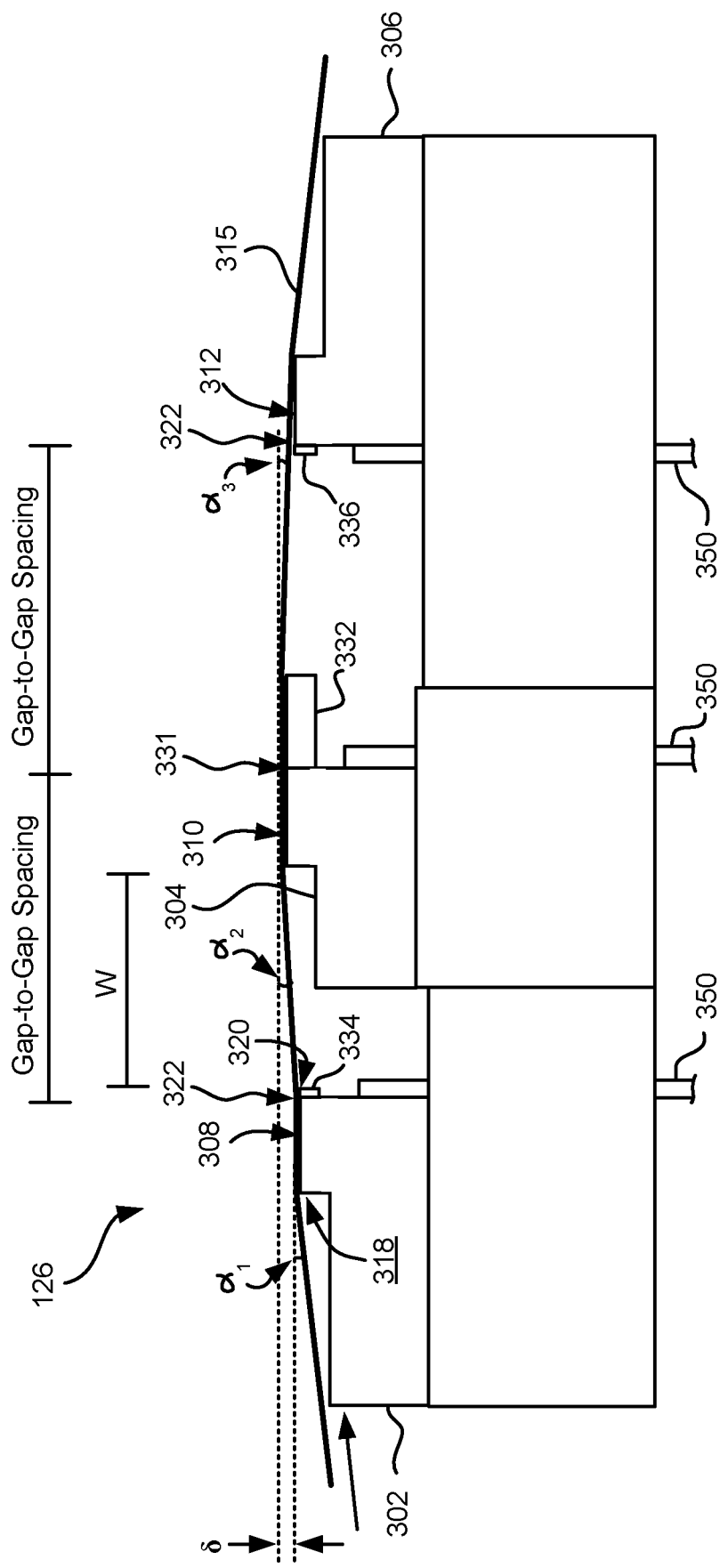
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
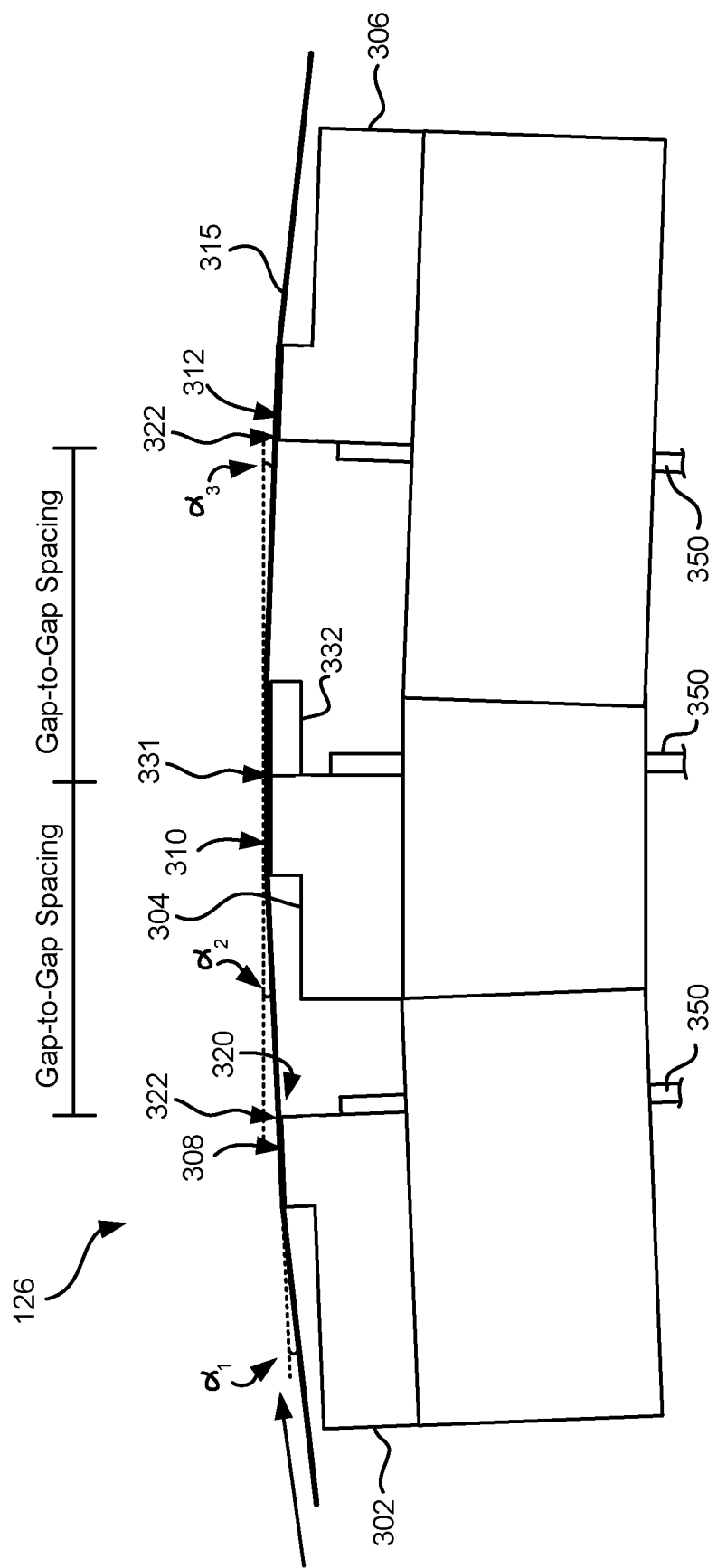
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
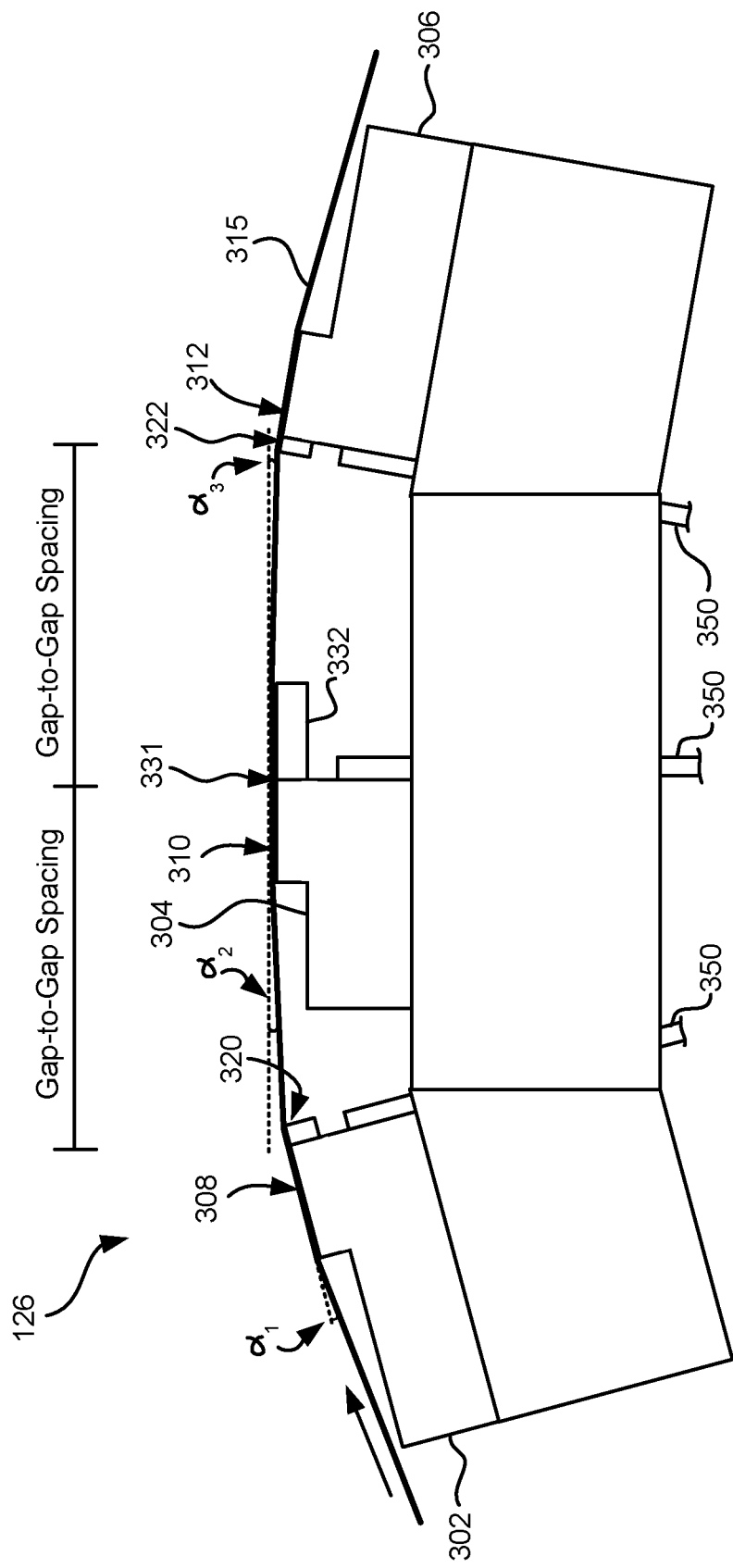
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
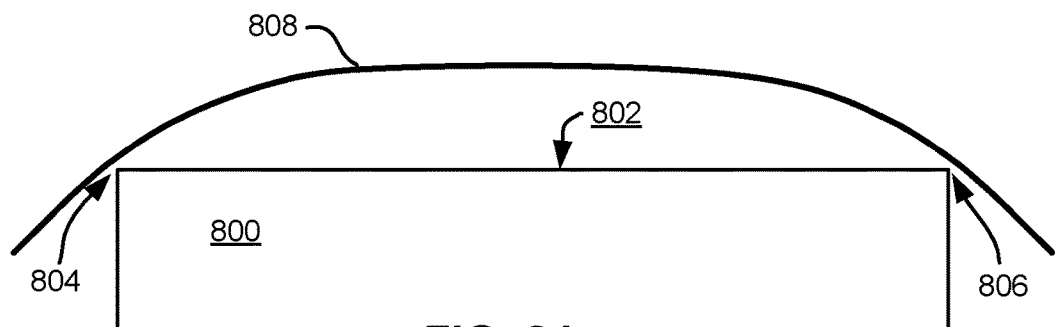
FIGS. 8A-8C are schematics depicting the principles of tape tenting.
Figure 8B:
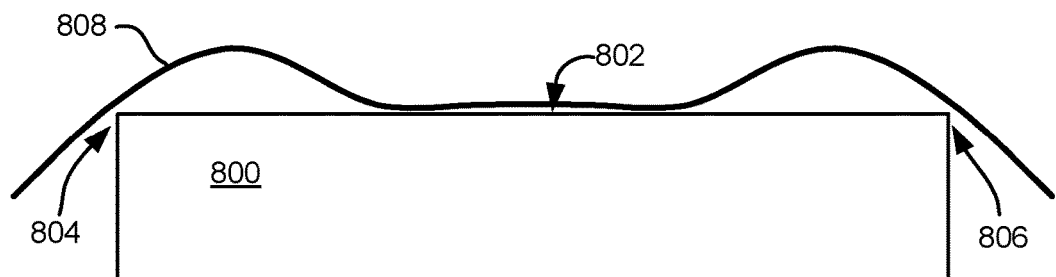
Figure 8C:
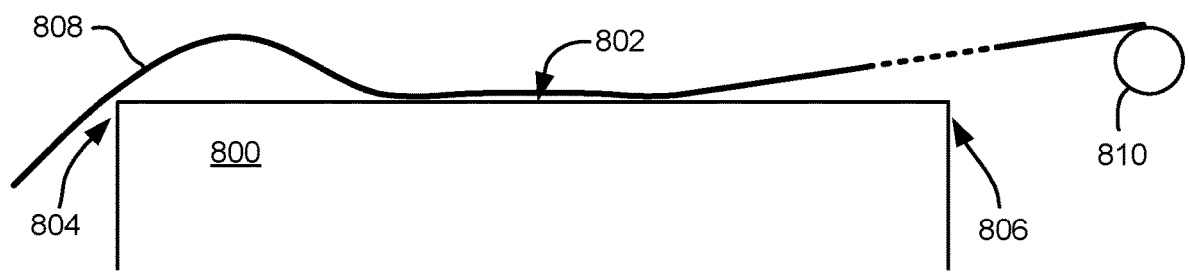

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
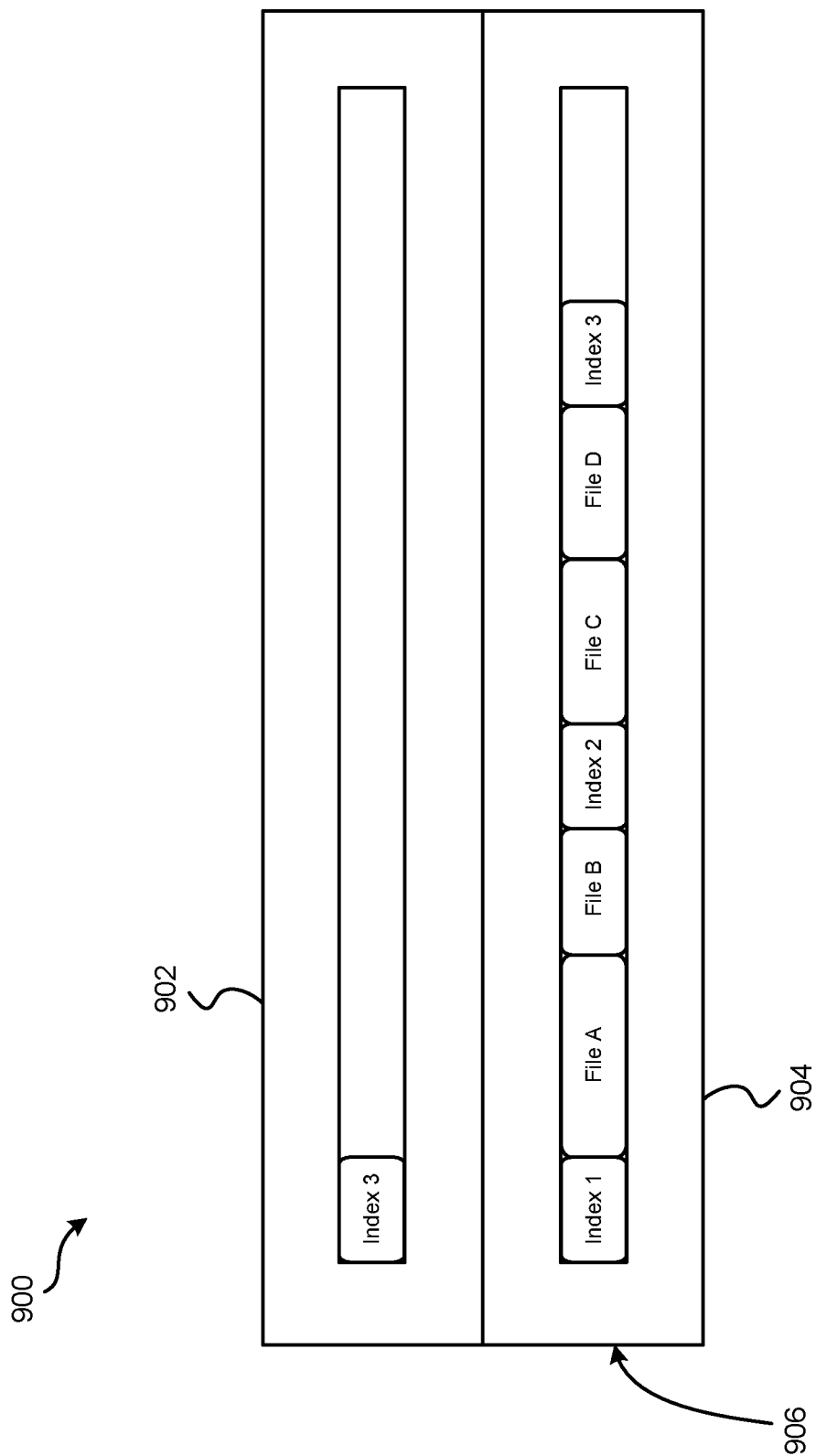
FIG. 9 is a representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As noted above, a continuing goal of the data storage industry is to improve data density, such as by reducing track width. However, limitations in head manufacturing result in variation in span of tracks from head-to-head, thereby leading to limits of areal density due to the resulting misplacement of tracks during writing. Moreover, such misplacement of written tracks present future repercussions in that it affects reading such data. Thus, the variation of span between channels from head-to-head is a serious problem. For instance, even though manufactured to exacting specifications on a single wafer, head span between outermost transducers can vary from head-to-head by as much as 600 nanometers (nm) or more in current generation LTO heads that are designed for writing and reading one-half inch, 4 data band magnetic recording tapes.

In one contemplated approach to create controlled expansion in a module, the span of data transducers and servo reading elements that flank the data transducers are altered by a heating element. For example, a head module may be comprised of a thin film resistive element positioned proximate to the transducers and coupled to a source of electrical current. When current flows through the resistive element, the temperature of the resistive element rises due to joule heating, which in turn raises the temperature of the module in the vicinity of the element. The increased temperature of and around the element induces thermal expansion of the heated region and thus an increase in the span of data transducers of the module.

In operation, the target transducer spacing and/or array length is determined as a function of the state of lateral expansion of the tape, e.g., if the tape is in a laterally expanded state relative to the state when it was written, the array length may be increased. Accordingly, comparing the timing detected by servo readers flanking the array of data transducers to the timing when the tape was written may indicate a change in the tape expansion or a change in head span or both, and thereby prompting an adjustment of the heating element to control the heat to the region.

The rise in temperature and thus the change in span of transducers is a function of several factors, including power dissipation in the resistive element, design of the resistive element, the precise location of the resistive element in the head module, tape velocity, head lands design, heat dissipation in the module, etc., the effect of each of which may be determined via modeling. Moreover, a magnetic recording tape moving over a head module effectively removes heat generated by the heating element. In some embodiments, the speed of the moving magnetic recording tape may be adjusted by the controller to alter head span. Generally, lower speeds of a moving magnetic recording tape results in higher temperature rise for a given heater power compared to a lower temperature rise by higher speeds of the moving magnetic recording tape. The moving magnetic recording tape may also become heated thereby resulting in tape expansion. Tape expansion due to increased heat may work against the heat-mediated expansion of the head span. Typically, however, the tape expands in response to increased temperature. Moreover, tape expansion due to heating may also be a function of tape speed, for a given power of heat generated by the resistive element.

FIG. 10A depicts a schematic diagram of an apparatus 1000 having a resistive heating element 1010 to control span between channels, in accordance with one contemplated embodiment. As an option, the present apparatus 1000 may be implemented in conjunction with features from any other embodiment listed herein, such as those described with reference to the other FIGS. Of course, however, such apparatus 1000 and others presented herein may be used in various applications and/or in permutations which may or may not be specifically described in the illustrative embodiments listed herein. Further, the apparatus 1000 presented herein may be used in any desired environment.

FIG. 10A illustrates a schematic drawing of an apparatus 1000, and particularly a module of the apparatus, having the resistive heating element 1010 aligned along a longitudinal axis of the span 1006 of an array of transducers 1008. As shown, the resistive heating element 1010 may be positioned above a substrate 1002 in the thin films between the substrate 1002 and a closure 1004 of a head module. The resistive heating element 1010 may be positioned below (recessed from) a tape bearing surface 1012. In some approaches, the resistive heating element 1010 may be offset above the substrate 1002 (e.g., offset approximately 1-5 microns, e.g., 3 microns above the substrate).

The resistive heating element(s) 1010 in this and other approaches described herein may be constructed of any conductive material that creates joule heating upon passing a current therethrough. Leads for connecting the resistive heating element 1010 to a controller cable may be fabricated in the thin films. One skilled in the art, once apprised of the teachings herein, would appreciate that conventional techniques and materials may be adapted for use in fabricating the heating element, surrounding layers, and leads.

FIG. 10B illustrates a predictive temperature rise in the module with heat generated from the resistive heating element 1010. A partial view of the module is shown with the substrate 1002 facing to the right and the closure 1004 toward the left of the schematic drawing. As expected for the resistive heating element 1010 in a rectangular shape, the temperature is greatest near the center of the span 1006 of the array. FIG. 10B shows the highest temperature as a first heated region 1020 depicted by the dark shading where the first heated region 1020 is positioned near the tape bearing surface 1012 and around the region of the span 1006 of the array of transducers 1008. In the illustrative predictive modeling study shown, the first heated region 1020 depicted by the dark shading may be at a temperature of about 78° C. for an ambient temperature of 30° C.

A temperature gradient in the module is represented in the drawing by the lines drawn crosswise on the module. The second heated region 1022 (not having a temperature as high as the dark shaded region of the first heated region 1020) surrounds the dark shaded region corresponding to the first heated region 1020 and may extend through the module in a cross-wise direction. In predictive modeling studies the second heated region 1022 may be about 64° C. Heated regions spreading out from the resistive heating element 1010 and the span 1006 of the array of transducers 1008 may include a $3^{rd}$ heated region 1024, a $4^{th}$ heated region 1026, a $5^{th}$ heated region 1028, a $6^{th}$ heated region 1030, and so on. In predictive modeling studies the temperatures of these regions may be approximately 60° C., 55.5° C., 51° C., 47° C., respectively, relative to the temperature of 78° C. of the first heated region 1020. Again, these temperatures are presented by way of example only for exemplary purposes only.

As is apparent from these modeling studies of a rectangular resistive heating element, the heat from the element produces a nonuniform temperature profile across the span 1006 of the array of transducers 1008, and in fact, a concentration of heat is generated toward the center of the array of transducers, resulting in the local "hot spot" toward the center, as depicted by the dark shaded region corresponding to the first heated region 1020.

FIG. 10C depicts a schematic drawing of the predictive thermal expansion per watt of heater power in the module in response to the temperature rise generated by the resistive heating element. Similar to the drawing of FIG. 10B, a partial view of the module of the apparatus 1000 is shown with the substrate 1002 to the right and the closure 1004 toward the left on the drawing of the module. As expected from the temperature gradient predictions of FIG. 10B, the thermal expansion of the module is not linear along the array. Rather, as shown in FIG. 10C, a non-uniform deformation of the region of the span 1006 of the array of transducers 1008 may result in response to the higher temperatures at the center of the array and the decreasing temperature away from the center of the array, resulting in greater pitch between transducers toward the middle of the array than at the ends, as well as localized protrusion of the tape bearing surface.

Moreover, the tape running across the module removes heat from the module via convection and radiative heat transfer. The cooling effect of the tape is variable due to factors such as varying tape speed, the lateral position of the tape above the module (e.g., because the module is wider than the tape, and the data bands are positioned across the width of the tape, the tape is usually positioned more to one side of a centerline of the module than another, resulting in one side of the module being cooled more than another and thus expanding less), etc.

From predictive modeling studies, the deviation from ideal linear expansion may be 20 nm or more. Thus, a single heating element as shown in FIG. 10A does not induce uniform expansion of the transducer region, and therefore, does not work as expected.

An additional problem includes nonuniformities of the tape. For example, tape lateral expansion may vary along the tape due to effects such as tape creep. Accordingly, even if the expansion of the array is perfect, the tracks on the tape itself may have a nonlinear expansion from the state they were written in.

Thus, providing a single resistive thin film heating element with a uniform resistivity throughout the element may not be a favorable solution to the problem of misregistration between channels in the head and tracks on tape.

Another first order mismatch correction technique is controlling tape tension to adjust tape width. Yet another contemplated technique is head array stretching. A further contemplated technique includes skewing the longitudinal axis of the array away from normal to the direction of tape travel. However, each of these techniques is generally limited to generally uniform transducer pitch control. As track density increases in future products, these approaches will be unable to compensate for the inherent nonuniformity of transducer to tape mismatch.

In various embodiments described herein, multiple expansion elements are positioned proximate the array of transducers. Each expansion element contributes to the overall expansion of the array, but with an emphasis on local expansion of the transducers closest thereto. Thus, the spans of sections of the array of transducers may be independently altered by expansion elements. This in turn provides much greater control over the uniformity of expansion of the array, as well as enabling adjustment of sections of the array to compensate for issues such as tape creep.

In one approach, each expansion element is a thermal expansion element such as a thin film resistive element coupled to a source of electrical current. When current flows through the resistive element, the temperature of the resistive element rises due to joule heating, which in turn raises the temperature of the module in the vicinity of the element. The increased temperature of and around the resistive element induces thermal expansion of the heated region and thus an increase in the span of the proximate section of data transducers of the module.

The rise in temperature and thus the change in span of transducers is a function of several factors, including power dissipation in the resistive element, design of the resistive element, the precise location of the resistive element in the head module, tape velocity, head lands design, heat dissipation in the module, etc., the effect of each of which may be determined via modeling. Moreover, a magnetic recording tape moving over a head module effectively removes heat generated by the heating element. In some embodiments, the speed of the moving magnetic recording tape may be adjusted by the controller to alter head span. Generally, lower speeds of a moving magnetic recording tape results in higher temperature rise for a given heater power compared to a lower temperature rise by higher speeds of the moving magnetic recording tape. The moving magnetic recording tape may also become heated thereby resulting in tape expansion. Tape expansion due to increased heat may work against the heat-mediated expansion of the head span. Typically, however, the tape expands in response to increased temperature. Moreover, tape expansion due to heating may also be a function of tape speed, for a given power of heat generated by the resistive element.

In another approach, the expansion elements are piezo expansion elements of known construction.

In yet another approach, the expansion elements are electrostrictive expansion elements of known construction. Equivalently electrostrictive contraction elements of known construction may be used to cause contraction of the array of transducers.

In further approaches, different types of expansion elements may be present on the module.

Preferably, the expansion elements are arranged side by side along a line extending parallel to the longitudinal axis of the array of transducers.

The expansion elements may be positioned behind the array relative to the tape bearing surface, alongside the array, etc.

The array of transducers also includes at least three servo readers. The aforementioned sections of the array of transducers may be defined between adjacent pairs of the servo readers. Each section has at least one data transducer.

In a preferred embodiment, a control circuit, e.g., the track following servo control system of the controller, is configured to individually control an extent of expansion of each expansion element based on feedback from the servo readers to attempt to maintain a target span length of each section of the array of transducers, e.g., a length that results in a transducer pitch that approximates the data track pitch of the moving magnetic recording tape operated on. In other approaches, the target span length of each section of data transducers may be a pre-determined value, e.g., a design value.

Each expansion element preferably has at least one independent pad coupled to the control circuit, e.g., via a cable.

The proper transducer spacing and/or array section length may be determined as a function of the state of lateral expansion of the tape, e.g., if the tape is in a laterally expanded state relative to the state when it was written, the array length may be increased. Accordingly, comparing the timing detected by servo readers flanking the array of data transducers to the timing when the tape was written may indicate a change in the tape expansion or a change in head span or both, and thereby prompting an adjustment of the heating element to control the heat applied to the region.

Figure 11:
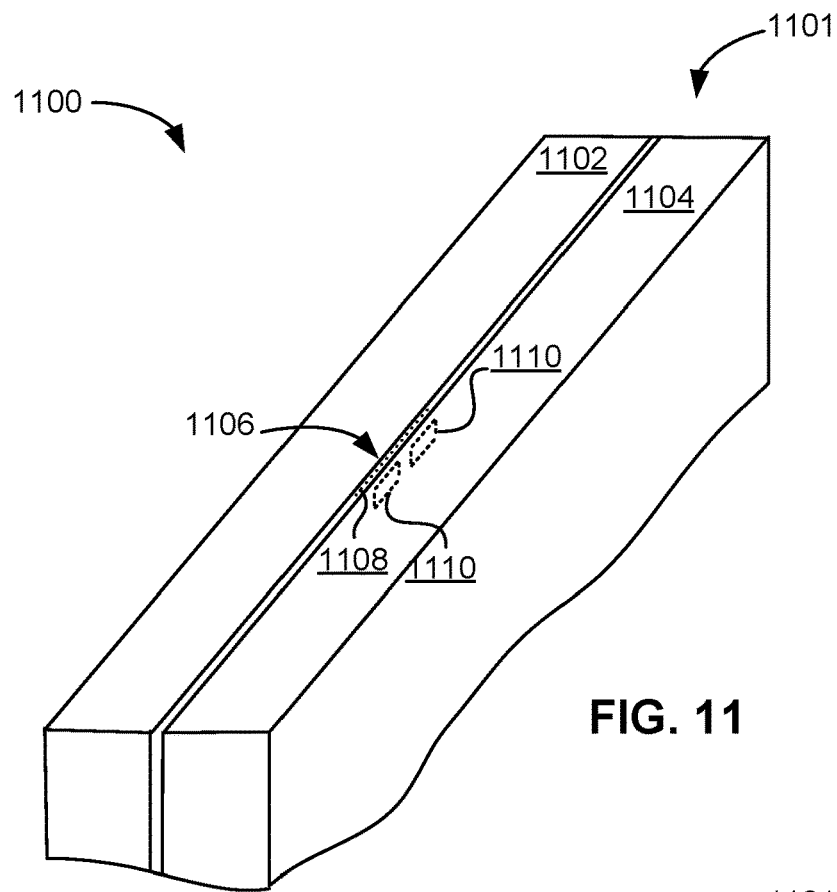
FIG. 11 is a schematic drawing of a partial view of an apparatus having multiple expansion elements, according to one embodiment.

FIG. 11 depicts an apparatus 1100 having a plurality of expansion elements for altering the span of sections of the array of transducers, in accordance with one embodiment. As an option, the present apparatus 1100 may be implemented in conjunction with features from any other embodiment listed herein, such as those described with reference to the other FIGS. Of course, however, such apparatus 1100 and others presented herein may be used in various applications and/or in permutations which may or may not be specifically described in the illustrative embodiments listed herein. Further, the apparatus 1100 presented herein may be used in any desired environment.

In the embodiment depicted in FIG. 11, an apparatus 1100 includes a module 1101 having an array 1106 of transducers 1108, two expansion elements 1110 positioned proximate to the array 1106 of transducers, a substrate 1102 and an optional closure 1104.

Figure 12:
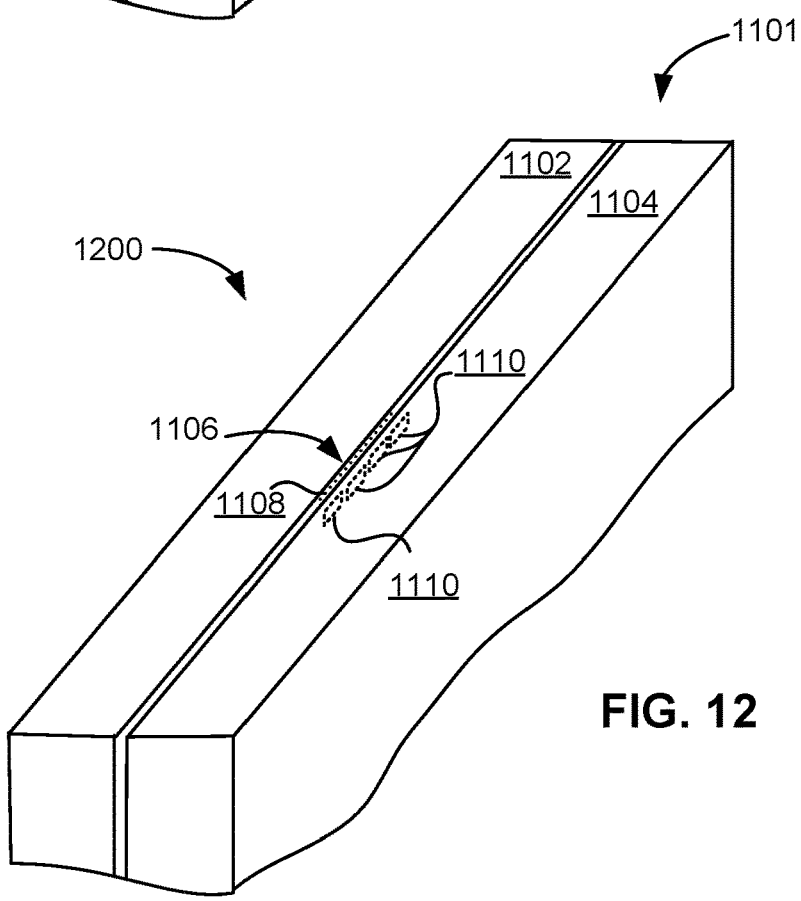
FIG. 12 is a schematic drawing of a partial view of an apparatus having multiple expansion elements, according to one embodiment.

In further approaches, e.g., as illustrated in FIG. 12, more than two expansion elements 1110 are present. FIG. 12 depicts an apparatus 1200 having a plurality of expansion elements for altering the span of sections of the array of transducers, in accordance with one embodiment. As an option, the present apparatus 1200 may be implemented in conjunction with features from any other embodiment listed herein, such as those described with reference to the other FIGS. Of course, however, such apparatus 1200 and others presented herein may be used in various applications and/or in permutations which may or may not be specifically described in the illustrative embodiments listed herein. Further, the apparatus 1200 presented herein may be used in any desired environment.

Any number of expansion elements 1110 may be present in various embodiments.

Some expansion elements 1110 may be configured to have different heat generation than other expansion elements 1110. In one approach where the expansion elements are thermal expansion elements, the resistance of a more central expansion element 1110 is less than the resistance of outer expansion elements 1110. In another approach, the resistance and/or heat generation of the more central expansion element 1110 is similar to the resistance and/or heat generation of each of the opposite expansion elements 1110 under identical electrical conditions.

The expansion elements 1110 may be controlled, e.g., by a drive controller, based on information derived from servo readers positioned adjacent the array of transducers. Information from the servo readers may be used to estimate the cross-track spacing of the transducers relative to the written tracks, e.g., servo tracks. This information may in turn be used to determine an amount of expansion to apply to each of the expansion elements.

The more granular the servo information collected per number of transducers, the more granular the control over the localized expansion can be. Accordingly, some approaches utilize several servo readers positioned along the array of transducers to determine localized information on the spacing of transducers between the servo readers. Preferably, where the number of expansion elements is N, the number of the servo readers is at least N+1, wherein N is an integer in a range of 2 to 16, but could be a higher number in some aspects.

Figure 13A:
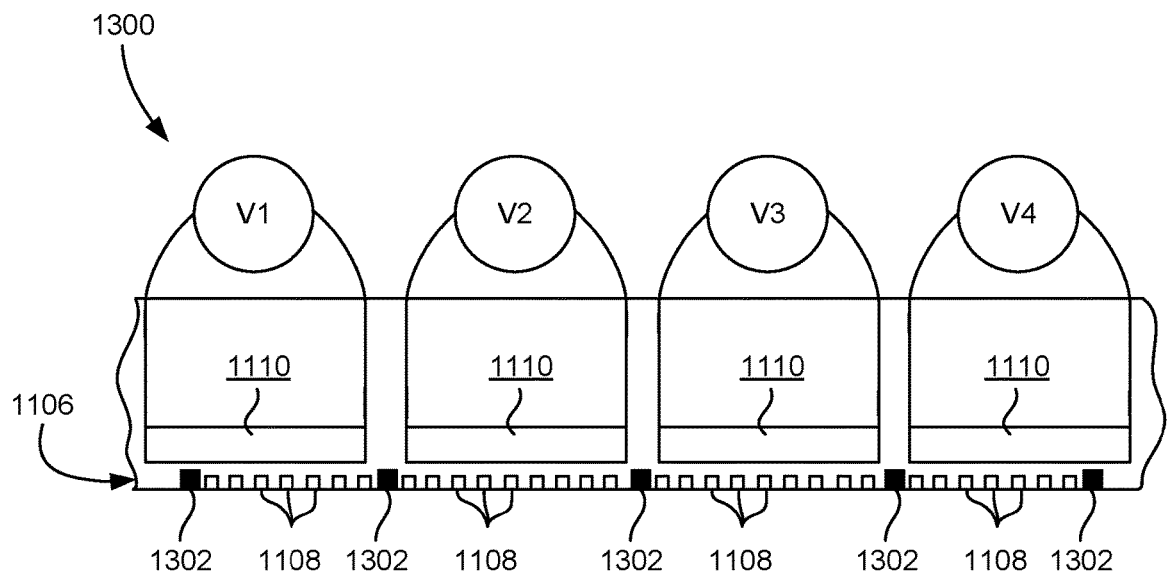
FIG. 13A is a representative view of an apparatus having a plurality of expansion elements and a plurality of servo readers, in accordance with one embodiment.

FIG. 13A is a representative view of an apparatus 1300 having a plurality of expansion elements 1110 and a plurality of servo readers 1302, in accordance with one embodiment. As an option, the present apparatus 1300 may be implemented in conjunction with features from any other embodiment listed herein, such as those described with reference to the other FIGS. Of course, however, such apparatus 1300 and others presented herein may be used in various applications and/or in permutations which may or may not be specifically described in the illustrative embodiments listed herein. Further, the apparatus 1300 presented herein may be used in any desired environment.

In the embodiment depicted in FIG. 13A, the apparatus 1300 includes an array 1106 of transducers 1108, N expansion elements 1110 positioned proximate to the array 1106 of transducers 1108, and N+1 servo readers 1302.

When a tape runs across the array 1106, the servo readers 1302 read tracks on the tape, e.g., servo tracks corresponding to the locations of the servo readers 1302. Information from adjacent pairs of the servo readers 1302 may be used to determine an amount of expansion to apply to the section of the array between the pair of servo readers 1302 via the adjacent expansion element 1110, e.g., by determining an estimated distance between the servo readers 1302 relative to the tracks reader thereby, and determining the amount of expansion to cause. For example, the estimated distance between the adjacent servo readers 1302 may be correlated to a correction factor via a lookup table and/or computation, and the correction factor used by the controller to effect the localized expansion via the associated expansion element 1110.

In general, the estimated distance between the adjacent servo readers 1302 corresponds to the pitch of the transducers 1108 therebetween. Therefore, the more servo readers 1302 and expansion elements 1110 present, the more granular the control over localized expansion of the array 1106.

By controlling each expansion element 1110 individually, the mismatch between transducers 1108 in each section and the data tracks on tape can be reduced locally.

A precalculated local and global expansion strain matrix may be used to determine how much expansion each expansion element 1110 should provide in order to adjust the long range and local expansion such that the entire system works in concert to minimize the transducer to track mismatch along the entire array 1106.

Figure 13B:
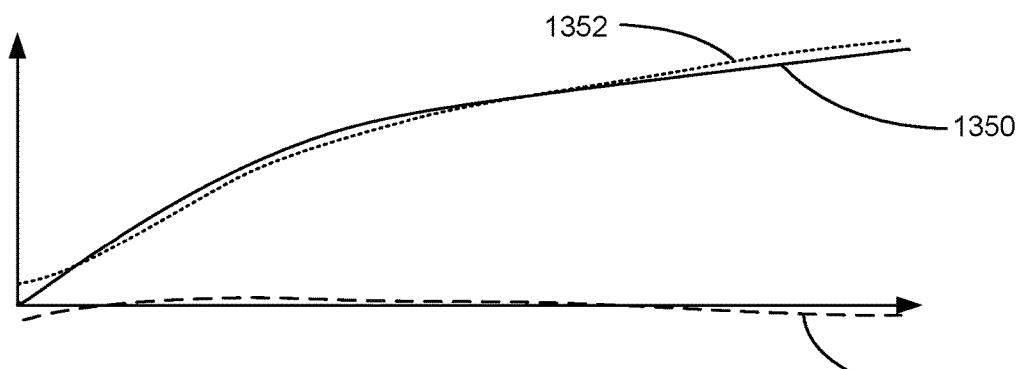
FIG. 13B is a chart depicting the expected distortion control afforded by the apparatus of FIG. 13A.

FIG. 13B is a chart depicting the expected distortion control afforded by the apparatus 1300 of FIG. 13A. The horizontal axis represents distance from the leftmost servo reader. The vertical axis represents the extent of mismatch in arbitrary units. Line 1350 represents an illustrative distortion of the head and/or tape resulting in a mismatch of the transducers from the tracks on tape when the leftmost servo reader is properly positioned relative to the associated servo track. As shown, the mismatch becomes more prevalent toward the right side of the array. Line 1352 represents the correction applied by determining the nonlinear distortion of the array and/or tape and controlling each expansion element of apparatus 1300 individually to induce nonlinear expansion of the array. Line 1354 represents the uncorrectable distortion, which is minimal.

Figure 14A:
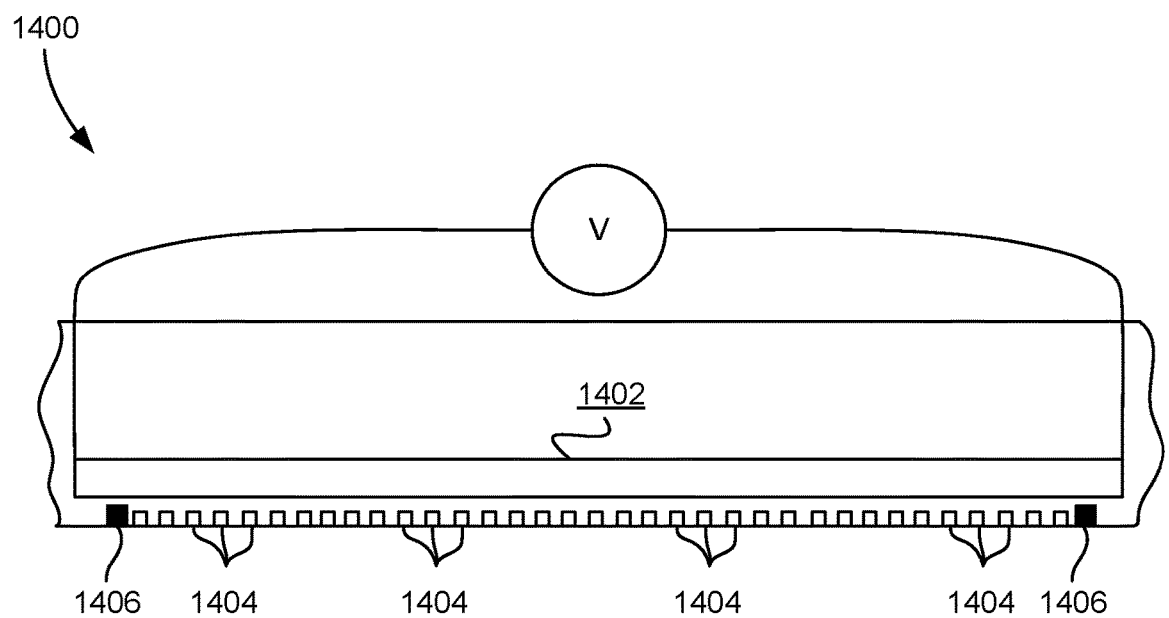
FIG. 14A is a representative view of an apparatus having a single expansion element, in accordance with one embodiment.
Figure 14B:
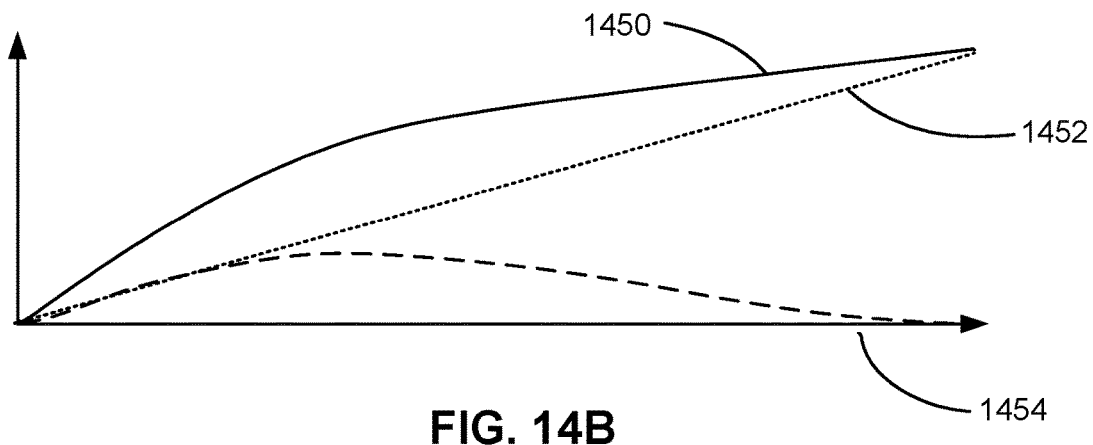
FIG. 14B is a chart depicting the expected distortion control afforded by the apparatus of FIG. 14A.

By comparison, FIG. 14A depicts an apparatus 1400 having a single expansion element 1402 for expanding an array of transducers 1404 based on information from a pair of servo readers 1406. FIG. 14B depicts the expected distortion control afforded by the apparatus 1400 of FIG. 14A. Line 1450 represents the illustrative distortion of the head and/or tape resulting in a mismatch of the transducers from the tracks on tape when the leftmost servo reader of apparatus 1400 is properly positioned relative to the associated servo track. As shown, the mismatch becomes more prevalent toward the right side of the array. Line 1452 represents the correction applied by the single expansion element. Line 1454 represents the uncorrectable distortion, which is much higher than that depicted in FIG. 13B. Accordingly, it is apparent how embodiments having multiple expansion elements with more granular control, such as that shown FIG. 13A, as well as those discussed elsewhere herein, vastly improve the ability to mitigate the mismatch between transducers and tracks.

Referring again to FIG. 13A, the tracks on tape (not shown) read by the servo readers 1302 may contain any information usable for the purposes stated herein. In a preferred embodiment, the tracks have timing-based servo patterns therein. The timing-based servo patterns may be of a type known in the art. Because the addition of servo tracks on tape reduces the number of data tracks writable on the tape, it is preferred that at least three data transducers 1108 be present between each adjacent pair of servo readers 1302, and more preferably, at least seven data transducers 1108. The number of data transducers 1108 between each adjacent pair of servo readers 1302 may be the same for all groups, or may be different for some groups than others.

Preferably, the outermost servo readers 1302 also function as the track following servos for read/write operations.

Each expansion element 1110 has at least one independent pad cabled to (or for cabling to) the drive electronics for operation thereof. In one approach, the track following servo system controls operation of the expansion element 1110. In FIG. 13A, V1, V2, V3 and V4 represent individual control circuits.

While a preferred embodiment is represented in FIG. 13A, various permutations are also contemplated.

In one approach, a number of the servo readers 1302 is M, while a number of the expansion elements 1110 is greater than M. M is an integer in a range of 2 to 16, but could be higher. For example, outermost expansion elements 1110 may be positioned outside the outermost servo readers 1302, e.g., to control expansion of outer sections of the module, thereby assisting in the global expansion of the module.

In another embodiment, outermost ones of the expansion elements 1110 are positioned at least in part beyond outer transducers of the array 1106 of transducers 1108. An illustrative configuration having this feature is shown in FIG. 13A. This configuration tends to normalize the localized expansion of the outermost sets of transducers 1108 by inducing expansion of the module beyond the array.

In another embodiment, outermost ones of the expansion elements 1110 are positioned entirely beyond outermost transducers of the array 1106 of transducers 1108. This configuration induces expansion of the module beyond the array 1106.

Figure 15:
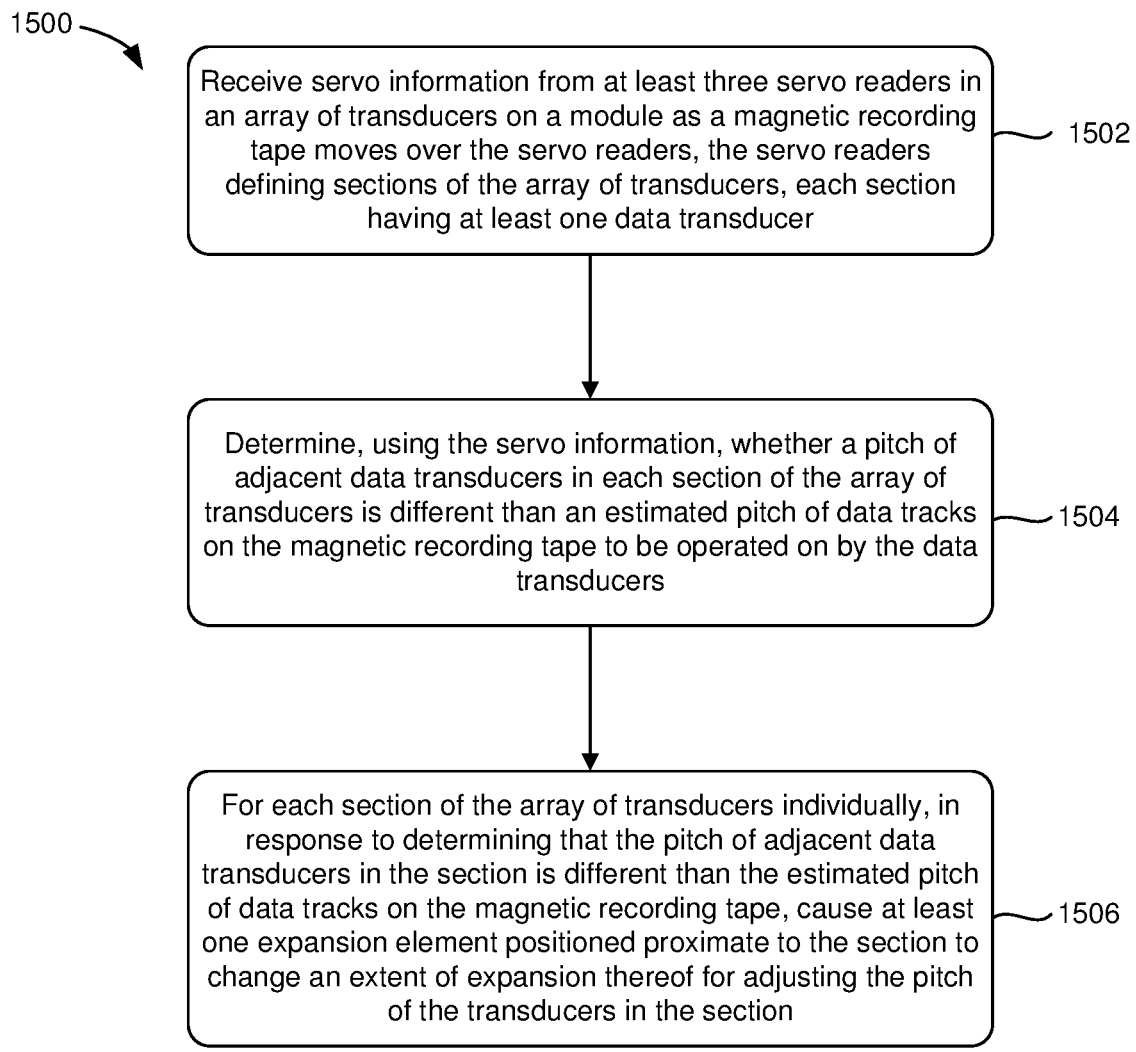
FIG. 15 is a flow chart of a method, according to one embodiment.

FIG. 15 depicts a method 1500 for nonlinearly adjusting the span of an array of transducers, in accordance with various embodiments. As an option, the present method 1500 may be implemented in conjunction with features from any other embodiment listed herein, such as those described with reference to the other FIGS. Of course, however, such a method 1500 and others presented herein may be used in various applications and/or in permutations which may or may not be specifically described in the illustrative embodiments listed herein. Further, the method 1500 presented herein may be used in any desired environment.

Operation 1502 includes receiving servo information from at least three servo readers in an array of transducers on a module as a magnetic recording tape moves over the servo readers. The servo readers define sections of the array of transducers, each section having at least one data transducer.

Operation 1504 includes determining, using the servo information, whether a pitch of adjacent data transducers in each section of the array of transducers is different than an estimated pitch of data tracks on the magnetic recording tape to be operated on by the data transducers. For example, determining whether the pitch of adjacent data transducers in each section of the array of transducers is different than the estimated pitch of data tracks on the magnetic recording tape may include reading adjacent servo tracks of the magnetic recording tape and deriving a distance therebetween.

Operation 1506 includes, for each section of the array of transducers individually, and in response to determining that the pitch of adjacent data transducers in the section is different than the estimated pitch of data tracks on the magnetic recording tape, causing at least one expansion element positioned proximate to the section to change an extent of expansion thereof for adjusting the pitch of the transducers in the section.

In any of the foregoing embodiments, additional operations may be performed to assist in minimizing the mismatch between transducers and tracks. For example, in one approach, tension of the moving magnetic recording tape over the array of transducers is adjusted for altering a width of the magnetic recording tape. In another approach, the array of transducers is skewed (tilted) away from a nominal angle relative to the direction of tape travel thereacross for altering a pitch of the array of transducers presented to the magnetic recording tape.

Various operations may be performed continuously, periodically, etc. in concert with one another in an effort to minimize the aforementioned mismatch.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
    a module having an array of transducers, and at least two expansion elements positioned proximate the array of transducers for expanding a section of the array of transducers adjacent thereto in a direction parallel to a longitudinal axis of the array of transducers thereby altering a pitch of adjacent transducers in the section of the array of transducers, the expansion elements being arranged side by side along a line extending parallel to the longitudinal axis of the array of transducers, wherein the array of transducers includes at least three servo readers; and
    a controller electrically coupled to the expansion elements, the controller being configured to individually control an extent of expansion of each expansion element based on feedback from the servo readers.

2. The apparatus as recited in claim 1, wherein the expansion elements are thermal expansion elements.

3. The apparatus as recited in claim 1, wherein the expansion elements are piezo expansion elements.

4. The apparatus as recited in claim 1, wherein a number of the expansion elements is N, wherein a number of the servo readers is at least N+1.

5. The apparatus as recited in claim 1, wherein a number of the servo readers is M, wherein a number of the expansion elements is greater than M.

6. The apparatus as recited in claim 1, wherein outermost ones of the expansion elements are positioned at least in part beyond outer transducers of the array of transducers.

7. The apparatus as recited in claim 1, wherein outermost ones of the expansion elements are positioned entirely beyond outer transducers of the array of transducers.

8. The apparatus as recited in claim 1, further comprising:
    a drive mechanism for passing a magnetic medium over the array of transducers,
    wherein the controller is electrically coupled to the array of transducers.

9. The apparatus as recited in claim 8, wherein the controller is configured to:

determine, using servo information derived from the servo readers, whether the pitch of adjacent data transducers in each section of the array of transducers is different than an estimated pitch of data tracks on a magnetic recording tape to be operated on by the transducers; and for each section of the array of transducers individually, in response to determining that the pitch of adjacent data transducers in the section is different than the estimated pitch of data tracks on the magnetic recording tape, causing at least one expansion element positioned proximate to the section to change an extent of expansion thereof for adjusting the pitch of the transducers in the section.

10. A method, comprising:

receiving servo information from at least three servo readers in an array of transducers on a module as a magnetic recording tape moves over the servo readers, the servo readers defining sections of the array of transducers, each section having at least one data transducer;

determining, using the servo information, whether a pitch of adjacent data transducers in each section of the array of transducers is different than an estimated pitch of data tracks on the magnetic recording tape to be operated on by the data transducers; and for each section of the array of transducers individually, in response to determining that the pitch of adjacent data transducers in the section is different than the estimated pitch of data tracks on the magnetic recording tape, causing at least one expansion element positioned proximate to the section to change an extent of expansion thereof for adjusting the pitch of the transducers in the section.

11. The method as recited in claim 10, wherein the expansion elements are thermal expansion elements.

12. The method as recited in claim 10, wherein the expansion elements are piezo expansion elements.

13. The method as recited in claim 10, wherein a number of the expansion elements is N, wherein a number of the servo readers is at least N+1.

14. The method as recited in claim 10, wherein a number of the servo readers is M, wherein a number of the expansion elements is greater than M.

15. The method as recited in claim 10, wherein determining whether the pitch of adjacent data transducers in each section of the array of transducers is different than the estimated pitch of data tracks on the magnetic recording tape comprises reading adjacent servo tracks of the magnetic recording tape and deriving a distance therebetween.

16. The method as recited in claim 10, comprising adjusting tension of the moving magnetic recording tape over the array of transducers for altering a width of the magnetic recording tape.

17. The method as recited in claim 10, comprising skewing the array of transducers away from a nominal angle relative to the direction of tape travel thereacross for altering a pitch of the array of transducers presented to the magnetic recording tape.

18. The method as recited in claim 10, wherein outermost ones of the expansion elements are positioned at least in part beyond outer transducers of the array of transducers.

19. A computer program product, the computer program product comprising a computer readable storage medium having program instructions embodied therewith, the program instructions executable by a controller to cause the controller to:

receive, by the controller, servo information from at least three servo readers in an array of transducers on a module as a magnetic recording tape moves over the servo readers, the servo readers defining sections of the array of transducers, each section having at least one data transducer;

determine, by the controller using the servo information, whether a pitch of adjacent data transducers in each section of the array of transducers is different than an estimated pitch of data tracks on the magnetic recording tape to be operated on by the data transducers; and for each section of the array of transducers individually, in response to determining that the pitch of adjacent data transducers in the section is different than the estimated pitch of data tracks on the magnetic recording tape, cause, by the controller, at least one expansion element positioned proximate to the section to change an extent of expansion thereof for adjusting the pitch of the transducers in the section.

20. A computer program product as recited in claim 19, comprising program instructions executable by a controller to cause the controller to:

adjust tension of the moving magnetic recording tape over the array of transducers for altering a width of the magnetic recording tape.

* * * * *